(12) United States Patent
Suzuki et al.

US012509538B2

(10) Patent No.: US 12,509,538 B2
(45) Date of Patent: Dec. 30, 2025

(54) FLAME-RETARDANT RUBBER COMPOSITION

(71) Applicant: NOK CORPORATION, Tokyo (JP)

(72) Inventors: Akihiro Suzuki, Kanagawa (JP); Makoto Noguchi, Kanagawa (JP)

(73) Assignee: NOK CORPORATION (JP)

( * ) Notice: Subject to any disclaimer, the term of this patent is extended or adjusted under 35 U.S.C. 154(b) by 415 days.

(21) Appl. No.: 17/795,183

(22) PCT Filed: Jan. 13, 2021

(86) PCT No.: PCT/JP2021/000870
§ 371 (c)(1),
(2) Date: Jul. 25, 2022

(87) PCT Pub. No.: WO2021/153234
PCT Pub. Date: Aug. 5, 2021

(65) Prior Publication Data
US 2023/0086938 A1  Mar. 23, 2023

(30) Foreign Application Priority Data
Jan. 31, 2020  (JP) .................................. 2020-014545

(51) Int. Cl.
| | | |
|---|---|---|
| C08F 210/18 | (2006.01) | |
| C08F 210/06 | (2006.01) | |
| C08F 210/08 | (2006.01) | |
| C08K 3/22 | (2006.01) | |
| C08K 5/14 | (2006.01) | |
| C08K 5/5425 | (2006.01) | |
| C08K 9/06 | (2006.01) | |

(52) U.S. Cl.
CPC .......... *C08F 210/18* (2013.01); *C08F 210/06* (2013.01); *C08F 210/08* (2013.01); *C08K 3/22* (2013.01); *C08K 5/14* (2013.01); *C08K 5/5425* (2013.01); *C08K 9/06* (2013.01); *C08K 2003/2227* (2013.01); *C08K 2201/005* (2013.01)

(58) Field of Classification Search
CPC .... C08F 210/18; C08F 210/06; C08F 210/08; C08K 3/22; C08K 5/14; C08K 5/5425; C08K 9/06; C08K 2003/2227; C08K 2201/005; C09K 21/02; C09K 2200/0239; C09K 2200/0645; C09K 3/1006; C08L 23/16; C08L 23/083; C08L 2201/02
See application file for complete search history.

(56) References Cited

U.S. PATENT DOCUMENTS

| | | | | | |
|---|---|---|---|---|---|
| 4,353,817 | A | * | 10/1982 | Nakae | ...................... C08L 23/16 524/400 |
| 5,700,538 | A | * | 12/1997 | Davis | ...................... C08L 91/00 524/427 |
| 2010/0152352 | A1 | * | 6/2010 | Barber | ...................... C08K 3/22 156/60 |
| 2013/0225746 | A1 | * | 8/2013 | Hansen | ............. B32B 17/10743 524/437 |
| 2016/0355665 | A1 | | 12/2016 | Daute et al. | |
| 2017/0210863 | A1 | * | 7/2017 | Nishiguchi | ........... C08L 53/025 |
| 2019/0040246 | A1 | | 2/2019 | Muratani et al. | |
| 2019/0276652 | A1 | | 9/2019 | Beek | |
| 2019/0352492 | A1 | | 11/2019 | Xu et al. | |
| 2021/0292531 | A1 | * | 9/2021 | Xu | ........................ C08L 23/286 |

FOREIGN PATENT DOCUMENTS

| | | | | |
|---|---|---|---|---|
| CN | 101704976 | A | 5/2010 | |
| CN | 102888059 | A | 1/2013 | |
| CN | 103224669 | A | 7/2013 | |
| CN | 103467898 | A | 12/2013 | |
| CN | 103819821 | A | 5/2014 | |
| CN | 106633429 | A | 5/2017 | |
| CN | 108623921 | A | 10/2018 | |
| EP | 955424 | A1 * | 11/1999 | .............. C08L 23/16 |
| JP | S4978741 | A * | 7/1974 | |
| JP | 2002241548 | A * | 8/2002 | |
| JP | 2002293976 | A | 10/2002 | |
| JP | 2007204621 | A | 8/2007 | |
| JP | 2013194232 | A | 9/2013 | |
| JP | 2018016747 | A | 2/2018 | |

(Continued)

OTHER PUBLICATIONS

Indrajati, "Performance of Maleated castor oil based plasticizer on rubber: rheology and curing characteristic studies, " 2017, Innovation in Polymer Science and Technology, 223, 1-10 (Year: 2017).*
International Search Report (English and Japanese) and Written Opinion (Japanese) of the ISA issued in PCT/JP2021/000870, mailed Mar. 9, 2021; ISA/JP (12 pages).
First Office Action issued in corresponding Chinese Patent Application No. 202180006031.6 dated Feb. 17, 2023, with English translation (19 Pages).

*Primary Examiner* — Robert S Jones, Jr.
*Assistant Examiner* — Joshua Caleb Bledsoe
(74) *Attorney, Agent, or Firm* — Harness, Dickey & Pierce, P.L.C.

(57) ABSTRACT

A flame-retardant rubber composition is provided which is excellent in flame retardancy and rubber properties and reduces environmental load. The flame-retardant rubber composition comprises an ethylene/α-olefin/non-conjugated diene copolymer, a hydrated metal oxide, a silane coupling agent, a plasticizer, and a cross-linking agent, wherein a carbon number of the α-olefin of the ethylene/α-olefin/non-conjugated diene copolymer is three and more, and 180 to 350 parts by mass of the hydrated metal oxide and 10 to 60 parts by mass of the plasticizer are included per 100 parts by mass of the ethylene/α-olefin/non-conjugated diene copolymer.

7 Claims, No Drawings

(56) References Cited

FOREIGN PATENT DOCUMENTS

| | | | |
|---|---|---|---|
| JP | 2018507263 A | | 3/2018 |
| JP | 2018135475 A | | 8/2018 |
| JP | 2019065162 A | * | 4/2019 |
| JP | 2019535877 A | | 12/2019 |
| WO | 2018130191 A | | 7/2018 |

* cited by examiner

FLAME-RETARDANT RUBBER COMPOSITION

CROSS REFERENCE TO RELATED APPLICATIONS

This application is a U.S. National Phase Application under 35 U.S.C. 371 of International Application No. PCT/JP2021/000870, filed on Jan. 13, 2021, which claims priority to Japanese Patent Application No. 2020-014545, filed on Jan. 31, 2020. The entire disclosures of the above applications are expressly incorporated by reference herein.

BACKGROUND

Technical Field

The present disclosure relates to an olefin based flame retardant rubber composition.

Related Art

An ethylene/α-olefin/non-conjugated diene copolymer represented by an ethylene propylene diene copolymer is excellent in mechanical properties, heat resistance, weather resistance or the like, and is low priced. Therefore, it is used in a wide range of applications such as auto parts, electrical parts, and supplies for construction materials.

Recently, as demands on qualities of performances of automobiles and electric appliances are increasing, thereby higher functions are also required for rubber compositions configuring sealing materials used in such products. Namely, rubber compositions are required to have excellent rubber properties such as hardness and compression sets or the like, low temperature properties, and flame retardant. In order to provide such rubber compositions having high performances, a variety of techniques have been developed so that the properties of rubber compositions containing an ethylene/α-olefin/non-conjugated diene copolymer are further improved.

As a technique improving performances such as flame retardant, a reduction of environmental loads, or the like, further, the Japanese Patent Unexamined Application Publication No. 2013-194232, for example, discloses a flame retardant composition including an ethylene propylene rubber having a halogen-based flame retardant agent. The Japanese Patent Unexamined Application Publication No. 2002-293976 and Japanese Patent Unexamined Application Publication No. 2007-204621 disclose halogen-free flame retardant foam materials including rubber compositions. The Japanese Patent Unexamined Application Publication No. 2018-16747 discloses a flame retardant rubber composition including an acid-modified polyolefin in which a metal hydroxide is used as a flame retardant agent.

The flame retardant composition of the patent literature 1, however, could cause environmental pollution by a halogen-based flame retardant agent. The blowing agents of the patent literatures 2 and 3 are halogen-free, however, they are blowing materials and inferior to rubber properties, thereby they are not appropriate as sealing materials. Further, the rubber composition of the patent literature 4 is also halogen-free, however, an increase in the hardness is predicted from the materials of the composition and the rubber properties would be considered as insufficient.

The composition of the present disclosure has been developed in view of the above circumstances. Thus, an object of the present disclosure is to provide a flame retardant rubber composition which is excellent in flame retardancy and rubber properties and decreases environmental load.

SUMMARY

The present inventors have examined types and amounts of flame retardant agents which are included in flame retardant rubber compositions in order to solve the above problems. Eventually, the inventors have found out that, by using a hydrated metal oxide as a flame retardant agent and by including certain amounts of the hydrated metal oxide and a plasticizer in a flame retardant rubber composition, flame retardancy and rubber properties of flame retardant rubber compositions are improved, and environmental load is reduced. The present disclosure is arrived based on such findings.

Therefore, the flame retardant rubber composition of the present disclosure is related to a flame retardant rubber composition comprising an ethylene/α-olefin/non-conjugated diene copolymer, a hydrated metal oxide, a silane coupling agent, a plasticizer and a cross-linking agent, in which a carbon number of the α-olefin of the ethylene/α-olefin/non-conjugated diene copolymer is three and more. The flame retardant rubber composition comprises 180 to 350 parts by mass of the hydrated metal oxide and 10 to 60 parts by mass of the plasticizer per 100 parts by mass of the ethylene/α-olefin/non-conjugated diene copolymer.

Advantageous Effects

The flame retardant rubber composition of the present disclosure is excellent in flame retardancy and rubber properties, and reduces environmental load.

DETAILED DESCRIPTION

Hereinafter, embodiments of the present disclosure will be described in detail. However, the scope of the present disclosure is not limited to those embodiments shown as examples described below.

A flame retardant rubber composition of the present embodiment includes an ethylene/α-olefin/non-conjugated diene copolymer, a hydrated metal oxide, a silane coupling agent, a plasticizer, and a crosslinking agent. Among the components configuring the flame retardant rubber composition, the hydrated metal oxide, by being compounded, reduces environmental load of the heat retardant rubber composition and improve flame retardancy of the heat retardant rubber composition. Further, the crosslinking agent and the plasticizer, by being compounded appropriately, improve mixing processability, rubber properties, or the like of the flame-retardant rubber composition. Hereinafter, each component of the flame-retardant rubber composition is explained.

(Ethylene/α-Olefin/Non-Conjugated Diene Copolymer)

The α-olefin of the ethylene/α-olefin/non-conjugated diene copolymer of the present embodiment is α-olefin with three or more carbon atoms, preferably α-olefin with four or more carbon atoms. The α-olefin with three or more carbon atoms is, for example, propylene, 1-buten, 1-penten, 1-hexene, 4-methyl-1-pentene, 1-octene, 1-decene, or the like. Use of the α-olefin with three or more carbon atoms prevents polyethylene from crystallizing and improves the elasticity and low-temperature properties of the flame retardant rubber composition. Further, an increase of the carbon numbers of the α-olefin reduces entanglements of the backbone chain and increases movability of the backbone chain, and further improves low-temperature properties of the flame retardant rubber composition.

The non-conjugated diene includes, for example, non-conjugated diene chain such as 1,4-hexadiene, 1,6-octadiene, 2-methyl-1,5-hexadiene, 6-methyl-1,5-heptadiene and 7-methyl-1,6-octadiene; cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chlolomethyl-5-isopropenyl-2-norbornene; and triene such as 2,3-diisopropylidene-5-norbornene, 2-ethylidene-3-isopropylidene-5-norbornene, 2-propenyl-2,2-norbornadiene, 1,3,7-octatriene and 1,4,9-decatriene.

(Hydrated Metal Oxide)

The hydrated metal oxide includes, for example, hydrated metal compounds such as aluminum hydroxide, magnesium hydroxide, a hydrate of magnesium oxide/nickel oxide, and a hydrated metal compound of a hydrate of magnesium oxide/zinc oxide, or the like. Among them, aluminum hydroxide is preferable. Aluminum hydroxide has a high endothermic energy amount during pyrolysis compared to other hydrated metal oxides, and even small amounts of aluminum hydroxide may exhibit excellent flame retardant. Therefore, use of aluminum hydroxide as a flame retardant agent reduces the amount of the flame retardant agent to be used and provides a flame retardant rubber composition with excellent properties such as hardness, a compression set, or the like. The flame retardant agent may be used only one type, and also a mixture of two or more types of flame retardant agents may be used.

The flame retardant rubber composition of the present embodiment includes 180 to 350 parts by mass, preferably 200 to 340 parts by mass of a hydrated metal oxide as a flame retardant agent per 100 parts by mass of an ethylene/α-olefin/non-conjugated diene copolymer. The hydrated metal oxide is a non-halogen/non-antimon based inorganic flame retardant agent. Use of the hydrated metal oxide as a flame retardant agent improves the flame retardancy of the rubber composition, and also reduces environmental load.

Use of 180 or more parts by mass of the hydrated metal oxide improves the flame retardancy of the flame retardant rubber composition. On the other hand, use of 350 or less parts by mass of the hydrated metal oxide gives a softness suitable for a sealing material or the like, to the flame retardant rubber composition.

As the hydrated metal oxide, a hydrated metal oxide in a particle form is preferably used. The average particle size of the hydrated metal oxide is preferably 0.6 to 10 μm, more preferably 0.9 to 5.0 μm. The hydrated metal oxide having the average particle size of 0.6 μm or more improves its dispersion and processability during mixing. On the other hand, The hydrated metal oxide having the average particle size of 10 μm or less is given flame retardancy with mechanical properties of a rubber material maintained.

(Silane Coupling Agent)

The flame retardant rubber composition contains a silane coupling agent in addition to the hydrated metal oxide. The hydrated metal oxide preferably has a surface treatment with the silane coupling agent. As the silane coupling agent, alkoxysilane having a vinyl group, such as vinyltrimethoxysilane, vinyltriethoxysilane and vinyltris(2-methoxyethoxy)silane or the like, or oligomers thereof are used. The silane coupling agent is preferably included at 1 to 5 parts by mass, preferably 2 to 4 parts by mass, per 100 parts by mass of the hydrated metal oxide.

Compounding of the flame retardant rubber composition with the silane coupling agent improves the compression set of the flame retardant rubber composition. Further, treating the surface of the hydrated metal oxide with the silane coupling agent before compounding improves the compatibility of the hydrated metal oxide and allows the hydrated metal oxide uniformly dispersed in the flame retardant rubber composition. This reduces the amount of the hydrated metal oxide to be compounded and prevents an increase of the hardness of the flame retardant rubber composition.

(Plasticizer)

In order to improve the processability and rubber properties of a flame retardant rubber composition, 10 to 60 parts by mass of a plasticizer is compounded per 100 parts by mass of an ethylene/α-olefin/non-conjugated diene copolymer, in the flame retardant rubber composition. The amount of the plasticizer is preferably 20 to 60 parts by mass. Use of a plasticizer at 10 and more parts by mass gives an appropriate softness to the flame retardant rubber composition and improves the suitability for a sealing material or the like. On the other hand, 60 and less parts by mass of plasticizer improves flame retardancy by increasing the ratio of the flame retardant agent to the total of the flame retardant rubber composition.

For the plasticizers, mineral oil and chemical synthesis oil may be used, in which the mineral oil and the chemical synthesis oil have aliphatic hydrocarbons as a main component and are commonly used for rubber compositions. The mineral oil is, for example, paraffin-based process oil and the chemical synthesis oil is, for example, poly-α-olefin, α-olefin oligomer or the like. Among the plasticizers described above, an ethylene/α-olefin oligomer is preferable. Although some types of plasticizers may cause a decrease of a compression set by compounding, the ethylene/α-olefin oligomer has little chance to cause such a decrease, thereby, which is a reason for the preference.

Ethylene/α-olefin oligomer is preferably used at 10 to 50 parts by mass per 100 parts by mass of the ethylene/α-olefin/non-conjugated diene copolymer, and 20 to 45 parts by mass of ethylene/α-olefin oligomer is more preferable. 10 and more parts by mass of ethylene/α-olefin oligomer gives an appropriate softness to a flame retardant rubber composition and improves suitability to a sealing material or the like. On the other hand, 50 and less parts by mass of ethylene/α-olefin oligomer prevents a rubber material or the like from sticking to a kneader during a mixing process.

(Crosslinking Agent)

For a crosslinking agent, crosslinking agents which may be used in crosslinking rubber compositions in general may be compounded, while particularly organic peroxide is preferable. The reason for the preference is that the organic peroxide does not contain a sulfur compound and does not corrode a metallic material coming in contact with a flame retardant rubber composition.

The organic peroxide is, for example, tert-buthyl peroxide, dicumyl peroxide, tert-buthyl cumyl peroxide, 1,1-di (tert-buthyl peroxy)-3,3,5-trimethyl cyclohexane, 2,5-dimethyl-2,5-di(tert-buthyl peroxy)hexane or the like. The organic peroxide is preferably compounded at 3 to 6 parts by mass per 100 parts by mass of the ethylene/α-olefin/non-conjugated diene copolymer.

(Rubber Properties)

Rubber properties mean properties such as the hardness, the compression set, the rebound resilience, the elongation, or the like of a rubber composition. The hardness of a flame retardant rubber composition of the present embodiment is preferably 60 to 80 as a JIS A hardness and is more preferably 65 to 75. JIS A hardness of 60 and more gives an appropriate strength to a flame retardant rubber composition.

On the other hand, JIS A hardness of 80 and less provides a high sealing ability when the composition is processed into a sealing material or the like, by giving an appropriate flexibility to a flame retardant rubber composition. Here, JIS A hardness is a hardness measured by a Type A durometer complying with JIS K-6253-3.

Further, a compression set measured by complying with JIS K-6262 is preferably 35% and less, and is more preferably 30% and less. Such rubber properties of the flame retardant rubber composition improve sealing ability when the flame retardant rubber composition is processed into a sealing material or the like.

(Low Temperature Properties)

Regarding a low temperature property of a flame retardant rubber composition of the present embodiment which is measured by complying with JIS K 6261-3:2017, a temperature at which the shrinkage becomes 10% (TR 10) is preferably −40° C. and less, more preferably −50° C. and less. Having such low temperature properties improves the suitability for a product used under a low temperature circumstance.

(Flame Retardancy)

The flame retardancy of a flame retardant rubber composition of the present embodiment is preferably V-0 of UL94 flammability standard. Having such flame retardancy improves the suitability for use in a product used in a high temperature circumstance, for example a gasket or the like.

A flame retardant rubber composition of the present embodiment may be used suitably as a sealing material used in a temperature condition of −40° C. to +150° C., for example, a molding material for an O-ring, a D-ring, a X-ring, a gasket, a packing, a diaphragm, bulb, or the like. Particularly, the flame retardant composition may be used suitably as a molding material for a sealing material or the like, which contact with high temperature and heated oil.

EXAMPLES

Hereinafter, the present disclosure is described by comparing examples and comparative examples. However, the scope of the present disclosure is not limited to the examples described below.

Materials used in examples and comparative examples are described below.
(1) Ethylene-butene-non-conjugated diene rubber (EBDM): Mitsui Chemicals, Inc., EBT K-9330, iodine value 16
(2) Ethylene-propylene-non-conjugated diene rubber (EPDM): Sumitomo Chemical Co., Ltd., ESPRENE 505A, iodine value 26
(3) Aluminum hydroxide-1: Nippon Light Metal Co., Ltd., BF013, the average particle size 1 μm, the surface is untreated with a vinyl-based silane coupling agent
(4) Aluminum hydroxide-2: Nippon Light Metal Co., Ltd., BF013STV, the average particle size 1 μm, the surface is treated with a vinyl-based silane coupling agent
(5) Aluminum hydroxide-3: Sumitomo Chemical Co., Ltd., dried powdering product of AHT #B, the average particle size 0.5 μm
(6) Magnesium hydroxide: Konoshima Chemical Co., Ltd., MAGSEEDS® N, the average particle size 1 μm
(7) Magnesium oxide: Kyowa Chemical Industry Co., Ltd., Kyowamag™ 150
(8) Carbon: Asahi Carbon Co., Ltd., Asahi #35G
(9) Plasticizer-1 (Paraffin based processed oil): Idemitsu Kosan Co., Ltd., PW-380
(10) Plasticizer-2 (ethylene/α-olefin oligomer): Mitsui Chemicals, Inc., LUCANT™ HC-2000
(11) vinyl-based silane coupling agent: Momentive Performance Materials, STLQUEST A-171
(12) Crosslinking agent (organic peroxide): NOF Corporation, PERCUMYL® D (Method for Producing a Flame Retardant Rubber Composition)

An uncrosslinked rubber composition of Example 1 was produced by compounding 250 parts by mass of Aluminum hydroxide-2, 20 parts by mass of Plasticizer-1, 22 parts by mass of Plasticizer-2 per 100 parts by mass of ethylene/α-olefin/non-conjugated diene copolymer. A kneader (internal mixer) was used for producing the uncrosslinked rubber composition. Uncrosslinked rubber compositions of Examples 2 to 9 and Comparative Examples 1 to 14 were produced in the same way as Example 1 except for use of alternative components described in Tables 1 and 2.

Crosslinking agents described in Tables 1 and 2 were added to the uncrosslinked rubber composition of Examples 1 to 9 and Comparative Examples 1 to 14, and the mixtures were mixed by using open rolls. The mixtures were crosslinked at 180° C., for 10 minutes by using sheet-shaped molds under applying pressure. Then, post-cure was performed at 150° C., for 24 hours. Eventually, sheet-shaped crosslinked molded products with 2 mm thickness of flame retardant rubber compositions of Examples 1 to 9 and Comparative Examples 1 to 14 were obtained.

<Evaluation>

A variety of properties described below were evaluated by using the obtained uncrosslinked rubber compositions and sheet-shaped crosslinked molded products of flame retardant rubber compositions.

(Mixing Processability)

Tackiness of the rubber compositions to the kneaders upon the uncrosslinked rubber composition mixing by using open rolls, kneaders were evaluated based on the criteria described below. Good or Fair means a pass the evaluation.
Good: Extrudable without rubber sticking to the kneader
Fair: Extrudable but the rubber sticks to the kneader (JIS a Hardness)

JIS A hardness of the flame retardant rubber compositions were measured with a type A durometer by complying with JIS K-6253-3.

(Compression Set)

Compression sets of the flame retardant rubber compositions were measured by complying with JIS K-6262.

(Low Temperature Properties)

Temperatures when shrinking ratios of the flame retardant rubber compositions became 10% (TR 10) were measured by complying with JIS K-6261-3:2017.

(Flame Retardancy)

Flame retardant tests, UL94, for UL94 flammability standard were performed and whether the flame retardant of the flame retardant rubber composition was V-1 or V-0 was measured. A "Bad" was applied when the flame retardant was not evaluated as V-1 or V-0.

Evaluation results of Examples 1 to 9 are indicated in Table 1 and evaluation results of Comparative Examples of 1 to 14 are indicated in Table 2. The term "includes" in the Tables 1 and 2 indicates that the composition has a silane coupling agent although the content of the silane coupling agent is unknown, as the surface of aluminum hydroxide is previously treated with a silane coupling agent.

TABLE 1

| | | | Unit | Example 1 | Example 2 | Example 3 | Example 4 | Example 5 |
|---|---|---|---|---|---|---|---|---|
| Composition | Rubber | EBDM(iodine value: 16) | parts by mass | 100 | 100 | 100 | 100 | 100 |
| | | EPDM(iodine value: 26) | parts by mass | | | | | |
| | Heat-retardant agent | Aluminum hydroxide-1 | parts by mass | | | | 250 | |
| | | Aluminum hydroxide-2 | parts by mass | 250 | 250 | 250 | | 220 |
| | | Aluminum hydroxide-3 | parts by mass | | | | | |
| | | Magnesium hydroxide | parts by mass | | | | | |
| | | Magnesium oxide | parts by mass | | | | | |
| | | Carbon | parts by mass | | | | | |
| | Dispersion | Silane coupling agent | parts by mass | include | include | include | 3 | include |
| | Plasticizer | Plasticizer-1 | parts by mass | 20 | 42 | | 42 | 25 |
| | | Plasticizer-2 | parts by mass | 22 | | 42 | | |
| | Cross-linking agent | Organic peroxide | parts by mass | 4 | 4 | 4 | 4 | 3.5 |
| Evaluation | Processability | Kneading processability | | Good | Good | Fair | Good | Good |
| | Normal state physical properties | Hardness | JIS A | 70 | 72 | 70 | 72 | 75 |
| | | Low temperature property (TR10) | ° C. | −59 | −59 | −59 | −59 | −59 |
| | Properties | Compression set | % | 15 | 17 | 14 | 19 | 13 |
| | | Heat-retardancy (UL94) | | V-0 | V-0 | V-0 | V-0 | V-0 |

| | | | Unit | Example 6 | Example 7 | Example 8 | Example 9 |
|---|---|---|---|---|---|---|---|
| Composition | Rubber | EBDM(iodine value: 16) | parts by mass | 100 | 100 | 100 | |
| | | EPDM(iodine value: 26) | parts by mass | | | | 100 |
| | Heat-retardant agent | Aluminum hydroxide-1 | parts by mass | | | | |
| | | Aluminum hydroxide-2 | parts by mass | 250 | | 330 | 250 |
| | | Aluminum hydroxide-3 | parts by mass | | | | |
| | | Magnesium hydroxide | parts by mass | | 250 | | |
| | | Magnesium oxide | parts by mass | | | | |
| | | Carbon | parts by mass | | | | |
| | Dispersion | Silane coupling agent | parts by mass | include | 3 | include | include |
| | Plasticizer | Plasticizer-1 | parts by mass | 56 | 56 | 48 | 42 |
| | | Plasticizer-2 | parts by mass | | | | |
| | Cross-linking agent | Organic peroxide | parts by mass | 4 | 4 | 5 | 4 |
| Evalucation | Processability | Kneading processability | | Good | Fair | Good | Good |
| | Normal state physical properties | Hardness | JIS A | 65 | 70 | 75 | 70 |
| | | Low temperature property (TR10) | ° C. | −59 | −59 | −59 | −49 |
| | Properties | Compression set | % | 22 | 30 | 17 | 17 |
| | | Heat-retardancy (UL94) | | V-0 | V-0 | V-0 | V-0 |

TABLE 2

| | | | Unit | Comparative example 1 | Comparative example 2 | Comparative example 3 | Comparative example 4 | Comparative example 5 | Comparative example 6 | Comparative example 7 |
|---|---|---|---|---|---|---|---|---|---|---|
| Composition | Rubber | EBDM(iodine valued: 6) | parts by mass | 100 | 100 | 100 | 100 | 100 | 100 | 100 |
| | | EPDM(iodine value: 26) | parts by mass | | | | | | | |
| | Heat-retardant agent | Aluminum hydroxide-1 | parts by mass | 150 | | 175 | | | 250 | |
| | | Aluminum hydroxide-2 | parts by mass | | | | 175 | | | 428 |
| | | Aluminum hydroxide-3 | parts by mass | | | | | | | |
| | | Magnesium hydroxide | parts by mass | | 150 | | | | | |
| | | Magnesium oxide | parts by mass | | | | | 175 | | |
| | | Carbon | parts by mass | | | | | | | |
| | Dispersion | Silane coupling agent | parts by mass | 2 | 2 | 2 | include | 2 | | include |
| | Plasticizer | Plasticizer-1 | parts by mass | | | | | | 42 | 87 |
| | | Plasticizer-2 | parts by mass | | | | | | | |
| | Cross-linking agent | Organic peroxide | parts by mass | 3 | 3 | 3 | 3 | 3 | 4 | 5.5 |

TABLE 2-continued

| Evaluation | | | | | | | | | | |
|---|---|---|---|---|---|---|---|---|---|---|
| Evaluation | Processability | Kneading processability | | Good | Fair | Good | Good | Fair | Good | Good |
| | Normal state physical properties | Hardness | JIS A | 80 | 85 | 84 | 82 | 89 | 67 | 73 |
| | | Low temperature property (TR10) | ° C. | −59 | −59 | −59 | −59 | −59 | −59 | −58 |
| | Properties | Compression set | % | 11 | 20 | 10 | 8 | 30 | 50 | 22 |
| | | Heat-retardancy(UL94) | | Bad | Bad | V-0 | V-0 | Bad | V-0 | V-1 |

| | | | Unit | Comparative example 8 | Comparative example 9 | Comparative example 10 | Comparative example 11 | Comparative example 12 | Comparative example 13 | Comparative example 14 |
|---|---|---|---|---|---|---|---|---|---|---|
| Composition | Rubber | EBDM(iodine valued: 6) | parts by mass | 100 | 100 | 100 | | | | |
| | | EPDM(iodine value: 26) | parts by mass | | | | 100 | 100 | 100 | 100 |
| | Heat-retardant agent | Aluminum hydroxide-1 | parts by mass | | | | | | | |
| | | Aluminum hydroxide-2 | parts by mass | 175 | 250 | 330 | | | | |
| | | Aluminum hydroxide-3 | parts by mass | | | | 150 | 150 | 150 | 220 |
| | | Magnesium hydroxide | parts by mass | | | | | | | |
| | | Magnesium oxide | parts by mass | | | | | | | |
| | | Carbon | parts by mass | | | | 20 | 20 | 20 | 20 |
| | Dispersion | Silane coupling agent | parts by mass | include | include | include | | 0.5 | 3 | |
| | Plasticizer | Plasticizer-1 | parts by mass | 15 | 64 | 64 | 20 | 20 | 20 | 20 |
| | | Plasticizer-2 | parts by mass | | | | | | | |
| | Cross-linking agent | Organic peroxide | parts by mass | 3 | 4 | 5 | 6 | 6 | 6 | 6 |
| Evaluation | Processability | Kneading processability | | Good | Good | Good | Good | Good | Good | Good |
| | Normal state physical properties | Hardness | JIS A | 75 | 61 | 71 | 70 | 70 | 70 | 78 |
| | | Low temperature property (TR10) | ° C. | −59 | −58 | −58 | −48 | −48 | −48 | −48 |
| | Properties | Compression set | % | 14 | 27 | 19 | 40 | 38 | 12 | 43 |
| | | Heat-retardancy (UL94) | | V-1 | V-1 | V-1 | Bad | Bad | Bad | V-0 |

The evaluation results of Table 1 show that the flame retardant rubber compositions of Examples 1 to 9 have good properties in any category. On the other hand, the flame retardant rubber compositions of Comparative Examples 1 to 14 are inferior in any one of the categories of JIS A hardness, compression set and flame retardant.

The invention claimed is:

1. A flame retardant rubber composition comprising:
an ethylene/α-olefin/non-conjugated diene copolymer;
a hydrated metal oxide as a flame retardant agent;
a silane coupling agent; and
a plasticizer,
wherein a carbon number of the α-olefin of the ethylene/α-olefin/non-conjugated diene copolymer is three and more,
the flame retardant agent consists of hydrated alumina, and
a tackiness of the flame retardant rubber composition to a kneader upon the rubber composition being uncrosslinked and mixed by using an open roll is such that the rubber composition is extrudable without rubber sticking to the kneader,
the rubber composition further comprises:
a cross-linking agent that is dicumyl peroxide,
wherein 320 to 350 parts by mass of the hydrated metal oxide, 3 to 6 parts by mass of the cross-linking agent, and 10 to 60 parts by mass of the plasticizer are included per 100 parts by mass of the ethylene/α-olefin/non-conjugated diene copolymer, and 1 to 2 parts by mass of the silane coupling agent is included per 100 parts by mass of the hydrated alumina,
a flame retardancy of the flame retardant rubber composition is V-0 of UL94 flammability standard,
a hardness of the flame retardant rubber composition is 65 to 75 as a JIS hardness,
a compression set of the flame retardant rubber composition measured by complying with JIS K-6262 is 30% or less, and
a low temperature property of the flame retardant rubber composition measured by complying with JIS K 6261-3:2017 is such that a temperature at which a shrinkage thereof becomes 10% (TR 10) is −50° C. and less.

2. The flame retardant rubber composition of claim 1, wherein the hydrated metal oxide is treated by the silane coupling agent.

3. The flame retardant rubber composition of claim 1, wherein
the plasticizer comprises an ethylene/α-olefin oligomer, and
10 to 50 parts by mass of the ethylene/α-olefin oligomer is included per 100 parts by mass of the ethylene/α-olefin/non-conjugated diene copolymer.

4. A sealing part formed by crosslinking and molding the flame retardant rubber composition of claim 1.

5. The flame retardant rubber composition of claim 1, wherein
the plasticizer comprises an ethylene/α-olefin oligomer,
10 to 50 parts by mass of the ethylene/α-olefin oligomer is included per 100 parts by mass of the ethylene/α-olefin/non-conjugated diene copolymer.

6. The flame retardant rubber composition of claim 2, wherein
the plasticizer comprises an ethylene/α-olefin oligomer, and
10 to 50 parts by mass of the ethylene/α-olefin oligomer is included per 100 parts by mass of the ethylene/α-olefin/non-conjugated diene copolymer.

7. The flame retardant rubber composition of claim 1, wherein the silane coupling agent is selected from the group consisting of vinyltrimethoxysilane, vinyltriethoxysilane, and vinyltris(2-methoxy-ethoxy)silane.

* * * * *